(12) United States Patent
Miyahara

(10) Patent No.: US 8,702,359 B2
(45) Date of Patent: Apr. 22, 2014

(54) METHOD OF FORMING A RECESS IN A WORK

(75) Inventor: Hideyuki Miyahara, Nagano-ken (JP)

(73) Assignee: Nakamura Seisakusho Kabushikigaisha, Nagano (JP)

( * ) Notice: Subject to any disclaimer, the term of this patent is extended or adjusted under 35 U.S.C. 154(b) by 1243 days.

(21) Appl. No.: 12/154,848

(22) Filed: May 27, 2008

(65) Prior Publication Data

US 2008/0295561 A1 Dec. 4, 2008

(30) Foreign Application Priority Data

May 26, 2007 (JP) ................. 2007-139807

(51) Int. Cl.
*B23D 1/26* (2006.01)
*B23D 1/08* (2006.01)

(52) U.S. Cl.
USPC ........... 409/293; 409/304; 409/295; 409/327; 144/75; 72/324; 83/875; 30/168

(58) Field of Classification Search
USPC ......... 409/293, 304, 295, 244, 253, 259, 182, 409/327; 144/373, 136.95, 154.5, 75, 27; 72/324–326, 338, 71; 83/87, 875; 30/167.2, 167.1, 167, 168; 142/42, 56
IPC ....................................................... B23D 1/26
See application file for complete search history.

(56) References Cited

U.S. PATENT DOCUMENTS

| | | | | |
|---|---|---|---|---|
| 2,687,753 A | * | 8/1954 | Mount | 144/27 |
| 3,477,484 A | * | 11/1969 | Lapointe | 144/373 |
| 3,746,886 A | * | 7/1973 | Konopka | 377/122 |
| 3,886,639 A | * | 6/1975 | Pasternak | 72/325 |
| 3,901,312 A | * | 8/1975 | Pasternak | 165/181 |
| 4,404,882 A | * | 9/1983 | Mock | 83/869 |
| 6,145,365 A | | 11/2000 | Miyahara | |
| 6,341,651 B1 | * | 1/2002 | Ohta | 165/185 |
| 2004/0187307 A1 | * | 9/2004 | Wong | 29/832 |
| 2005/0193559 A1 | * | 9/2005 | Miyahara | 29/890.03 |

FOREIGN PATENT DOCUMENTS

| | | |
|---|---|---|
| JP | 3318907 | 4/1999 |
| JP | 2005-254417 A * | 9/2005 |
| JP | 2010-012520 A * | 1/2010 |

OTHER PUBLICATIONS

Charles G. Wheeler, Woodworking for Beginners, 1907, The Knickerbocker Press, pp. 441-444.*
Jeremy Broun, The Encyclopedia of Wood Working Techniques, 1993, Running Press, pp. 42-43.*

(Continued)

*Primary Examiner* — Erica E Cadugan
(74) *Attorney, Agent, or Firm* — Flynn, Thiel, Boutell & Tanis, P.C.

(57) ABSTRACT

A method of forming a recess in a work, a work in which the recess is to be formed is a material that can be cut. A cutting tool for forming the recess is held by a moving apparatus at a prescribed angle relative to the work. The cutting tool is moved in a carving direction for carving the work at the prescribed angle, and a thin cutting fin is vertically formed. Then, the cutting tool is moved in the horizontal direction, and the cutting fin is cut and separated from the work. The fin-forming step and the cutting step are repeatedly performed in sequence, whereby a recess having a prescribed depth d and area is formed in the work.

1 Claim, 8 Drawing Sheets

(56) References Cited

OTHER PUBLICATIONS

Declan O'Donoghue, The Complete Book of Woodworking, Nov. 1, 2003, The Lyons Press, 1st Edition, pp. 64-67.*

Ira Samuael Griffith, Essentials of Woodworking, 1908, The Manual Arts Press pp. 99-101.*

Printout from http://pachamamatrust.org/f2/1_K/CBu_build/W_chisels_KBu.htm; first viewed and printed by Examiner on Nov. 14, 2013 (which is the oldest date available to the Examiner for this reference at this point in time).*

* cited by examiner (A)

(B)

(A)

(B)

(C)

(D)

(E)

(F)

METHOD OF FORMING A RECESS IN A WORK

TECHNICAL FIELD

The present invention relates to a method of forming a recess, wherein a recess having a prescribed depth is formed in the surface of a work that is composed of a metal, a synthetic resin, or another material that can be cut.

BACKGROUND ART

Methods for forming a concave part having a prescribed shape in the surface of a work composed of a metal, synthetic resin, or another material include pressing methods in which a press is used, or chemical etching methods. Pressing methods in which a press is used are generally employed. In these methods, the punch of the press is pressed downwards onto one side of a metal plate having a prescribed thickness, and a recess having a prescribed shape is formed in the metal plate so as to leave a prescribed thickness at the bottom.

In chemical etching methods, a recess is generally formed in a metal plate from one side by well-known chemical etching processes.

However, among the aforedescribed conventional methods, pressing methods in which a press is used involve using a punch to press and form a recess in a metal plate. Metal of a volume equal to that of the recess is therefore pressed to the bottom and towards the periphery, the constituents of the peripheral metal portions are compacted, residual stress is imparted, curling occurs, and flatness is significantly disturbed. A protrusion forms on the other side of the metal plate due to the pressure on the recess, and the flatness deteriorates beyond repair. As a result, the effect of the residual stress is that the recess in particular will warp due to changes over the course of time, and therefore changes in dimensions may occur, causing serious problems from a quality standpoint. A large pressing force is also necessary for pressing out the concave part. A high-power press is necessary and the durability of the punch will worsen. Inevitable problems of increasing costs are therefore presented.

On the other hand, chemical etching methods involve chemically dissolving the metal from one side of a metal plate and forming a concave part. The etching therefore requires large amounts of time and this method is therefore unsuitable for mass production and involves the inevitable problems of cost increases. Etching also does not allow the dissolution of each portion to be controlled separately and problems are therefore presented in that the dimensional accuracy is poor and practical applications are limited.

In order to solve the aforementioned problems with conventional methods, in Japanese Patent No. 3318907 (Patent Document 1) the present applicant proposed and put into practice a method of forming a concave part in a metal plate, in which a concave part can be formed in a metal plate without applying large amounts of stress.

The method of forming a concave part described in Patent Document 1 is characterized in repeating a plurality of times a step for press-forming a concave part from one side of the metal plate, which has a prescribed thickness, in which the concave part has a prescribed shape that is shallower than the thickness of the plate, causing the metal of the convex part to travel to the other side of the metal plate, and forming a convex part having a height that is substantially equal to the depth of the convex part; and a step for cutting the convex part from the proximal end so as to achieve evenness with the surface of the other side. A concave part having a prescribed thickness is gradually formed in one side of the metal plate. Patent Document 1 (Japanese Patent No. 3318907)

SUMMARY OF INVENTION

Technical Problem

According to the aforedescribed method of forming a concave part, the step for press-forming the metal concave part having a prescribed shape in the metal plate and the step for cutting the convex part are performed on different sides of the metal plate and these steps are repeated a plurality of times. Different processes must therefore be performed on the metal plate from both sides thereof, and problems are presented due to the complexity of the steps. The concave part having the prescribed shape is formed by pressing the metal plate and problems are therefore presented in that the stress applied is not insignificant. Forming a large area is difficult when using a press to press-form the concave part and problems are presented in that a large concave part cannot be formed.

Accordingly, it is an object of the present invention to provide a method of forming a recess in which a recess having a prescribed depth is readily formed while applying little stress, even when the area is large, in the surface of a work composed of a material that can be cut. A second object is to provide a method of forming a recess in which scraps (cuttings) produced during the formation of the recess can be held in the recess and prevented from falling away.

Solution to Problem

In order achieve the aforedescribed objects, the present invention proposes a method of forming a recess in a work by using a cutting tool having a blade part formed on a distal end, and a moving apparatus for moving the cutting tool in a relative manner in a horizontal direction and in a carving direction in which the work is carved thereby at a prescribed angle, the cutting tool being held at a prescribed angle relative to the work composed of a cuttable material; the method characterized in forming a recess having a prescribed depth in the work using a fin-forming step for moving the cutting tool in the carving direction, carving the work using the blade part, and vertically forming a thin cutting fin, and a cutting step for subsequently moving the cutting tool in the horizontal direction and cutting and separating the cutting fin; and forming another recess using the cutting step and the fin-forming step for causing the cutting tool to move in a relative manner from an upstream side in an amount of a forming pitch in the carving direction and in the horizontal direction relative to the worked surface formed by vertically forming the cutting fin, after which the fin-forming step and the cutting step are repeatedly performed in sequence, and the recess having a prescribed depth and area is formed in the work.

In the present invention, a width of the cutting tool is formed to be equal to a width of the recess formed in a prescribed location in the work; the fin-forming step and the cutting step are repeatedly performed in sequence using the cutting tool on the work; and the recess, which has the prescribed depth and width, is formed in the work.

In the present invention, in the fin-forming step, when the cutting tool is used to carve the work and vertically form the cutting fin, the thickness of the proximal end of the cutting fin is formed so as to become successively thinner towards the tip, at least both sides of the proximal end of the cutting fin are made to protrude, and the scrap cut in the cutting step is held by being sandwiched between internal walls of the recess.

In the present invention, a narrow recess that is narrower than the recess that has a prescribed width and that is to be formed in a planned location in the work is formed by the cutting tool, which has a smaller width than the recess; this narrow recess is formed in a plurality of rows; and the recess having a wide width is formed.

In the present invention, after a channel having a prescribed depth and width is formed in advance in at least one end of the planned location for forming the recess in the work, the blade part of the cutting tool is moved and made to cut in the carving direction a plurality of times until reaching a bottom surface or the vicinity of the bottom surface of the channel, whereby a worked surface is formed slanting from the bottom surface of the recess to a surface of the work, and the recess is formed using the cutting step and the fin-forming step for causing relative movement of the cutting tool from the upstream side in the amount of the forming pitch in the carving direction and in the horizontal direction relative to the worked surface, after which the fin-forming step and the cutting step are repeatedly performed in sequence, and the recess having a prescribed depth and area is formed in the work.

In the present invention, a step is performed one or a plurality of times for moving the cutting tool in the carving direction and forming a fin whose proximal end is linked to the work on an end of the planned location for forming the recess in the work, until the blade part reaches a prescribed depth, whereby the worked surface is formed slanting from the prescribed depth to a surface of the work.

In the present invention, the step is performed one or a plurality of times for moving the cutting tool in the carving direction and forming the fin whose proximal end is linked to the work on an end of the planned location for forming the recess in the work, until the blade part reaches the prescribed depth, after which the cutting tool is made to face the opposite direction and is moved in the carving direction, and a plurality of the fins are cut and thereby separated, whereby the worked surface is formed.

Advantageous Effects of Invention

According to the method of forming a recess in a work according to the present invention, the work is carved and a thin cutting fin is vertically formed by the cutting tool. When the thin cutting fin is then cut and separated by the horizontal motion of the cutting tool, stress on the work is minimized and cutting can be readily performed due to the thinness of the cutting fin. The recess is formed in the work by the cutting tool and can therefore be readily formed even when the area of the recess is wide.

The width of the cutting tool is formed to be equal to the width of the recess, whereby a recess having the same width as the width of the cutting tool can be readily formed in a prescribed location on the work. The longitudinal length can be set as desired by the number of repetitions of the fin-forming step and the cutting step.

In the fin-forming step, the cutting fin is formed so that the proximal end is thick, whereby at least both sides of the proximal end of the cutting fin are made to protrude. The scrap resulting from cutting the cutting fin in the cutting step is therefore sandwiched between internal walls of the recess. The scraps are therefore retained within the recess, and scattering of the scraps can be prevented. As a result, breakage, damage, and other problems occurring on the readily-damaged blade due to the adherence of scraps to the cutting tool or the work can be prevented in advance.

The width of the cutting tool is formed to be smaller than the width of the recess, the fin-forming step and the cutting step are repeated, and a narrow first recess is formed. A second narrow recess is then formed adjoining the first recess, and recesses in a plurality of rows are then formed as necessary, whereby a recess having a large area can be readily formed. The use of a cutting tool having a smaller width than the recess allows the work to be cut using minor force and allows the stress on the work to be further alleviated.

A channel is formed in advance at one end of the planned location for forming the recess in the work, and the fin-forming step and the cutting step are repeated from this channel using the cutting tool, whereby the corner part between the internal wall and the bottom surface of the recess can be formed at a right angle.

Fins are formed having the proximal end linked to the work, whereby the fins can be prevented from falling away until the blade part of the cutting tool reaches a prescribed depth. A slanting worked surface is formed due to this formation of the fins. The fin-forming step and the cutting step are then repeated in sequence using the cutting tool, whereby a recess having a prescribed depth and area can be formed in the work. Once the recess has been formed, the linked fins join the scraps when the external shape of the work is cut to the prescribed shape. The thin, light fins therefore do not scatter, and breakage, damage, or other adverse occurrences due to scraps or fins adhering to the work or the blade part of the cutting tool can be prevented in advance.

Once the cutting tool has been used to form a plurality of fins in sequence at intervals of a prescribed pitch at one end of the planned location for forming the recess in the work, the plurality of fins is cut and separated by the cutting tool, whereby the worked surface can be formed, and the recess can be readily formed even if located in the central portion of the work.

DESCRIPTION OF EMBODIMENTS

Embodiments of the method of forming a recess in a work according to the present invention will be described below with reference to the drawings.

In the method of forming a recess in a work, a metal, a synthetic resin material, or another material that can be cut is used as the work. The cutting tool for forming the recess in the work is held in a moving apparatus at a prescribed angle (first slanting angle) relative to the work. The moving apparatus causes the cutting tool to move in a relative manner in a carving direction for carving the work at a prescribed angle (the first slanting angle) and in a horizontal direction (the direction parallel to the surface of the work). The cutting tool and the work are moved relative to one another, whereby, first, the fin-forming step is performed for moving the cutting tool in the carving direction, carving the work using the blade part, and vertically forming a thin cutting fin. The cutting step is then performed for moving the cutting tool in the horizontal direction (parallel direction), cutting the cutting fin, and separating the cutting fin from the work. A recess having a prescribed depth is thereby formed in the work. A location upstream of the worked surface by the distance of a previously determined formation pitch becomes the cutting start point. The worked surface was formed by vertically forming the cutting fin. The fin-forming step and the cutting step are then performed, and the fin-forming step and the cutting step are repeatedly performed in sequence thereafter farther upstream from the worked surface by the distance of the formation pitch, whereby the recess that is the ultimate goal is formed having a prescribed depth and a prescribed area in the work.

Embodiment 1

Figure 1:
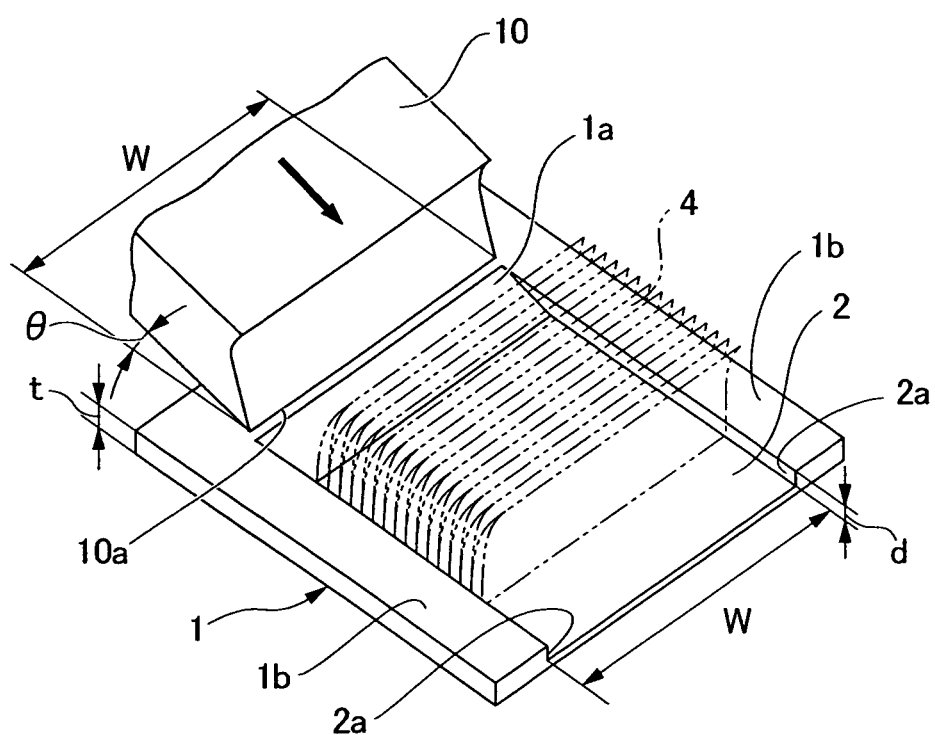
FIG. 1 is a perspective view showing an example of the method of forming a recess in a work according to the present invention.

FIG. 1 shows the configuration of a work 1 in which a recess 2 is formed. The material used in the work 1 is iron, aluminum, copper, stainless steel, other metals, or engineering plastic or another synthetic resin that can be cut. The work 1 is preferably configured in the shape of a flat plate, block, or sphere formed to allow the formation of the recess 2.

The work 1 shown in FIG. 1 is a metal plate that can be cut and that has been formed into a square shape having a thickness t ranging from 0.2 to several millimeters. The recess 2 is formed on one side of the work 1 and has a width W that is smaller than the width of the work 1 and a depth d that is smaller than the thickness t. The recess 2 is formed by a cutting tool 10. In the work 1 shown in FIG. 1, the forward-end side of the recess 2 is opened, and a slanted worked surface 1a is formed on the rearward-end side.

The cutting tool 10 is formed having a blade part 10a extending in a direction perpendicular to the direction of movement on the end on the bottom-surface side. The blade part 10a is set so that the angle between the bottom-surface blade edge surface and the forward blade edge surface is 30° to 90°. The width W of the cutting tool 10 is set to be equal to the width W of the recess 2 to be formed in the work 1. The cutting tool 10 is slanted at a prescribed angle θ and is held by a moving apparatus (not shown) so that the rearward-end side is higher than the work 1. The slanting angle θ of the cutting tool 10 is set appropriately according to the material of the work 1, the formation state of a fin 3 described hereinafter, the depth of the recess 2 to be formed, and the like, but is set to approximately 5° to 30°.

The moving apparatus is configured so that the cutting tool 10 can be attached and the work 1 immobilized in a set position. The moving apparatus also acts to advance the cutting tool 10 in a state maintaining the slanting angle θ (the first slanting angle) relative to the work 1 and to move the cutting tool in the horizontal direction (parallel direction) parallel to the surface of the work 1 after moving in the carving direction for carving the work 1. In the description of the present embodiment, the operation is such that the work 1 is immobilized, and the cutting tool 10 is moved, but the cutting tool 10 may be immobilized and the work 1 moved, or both the cutting tool 10 and the work 1 may be moved, or, if the cutting tool 10 and the work 1 are to be moved relative to one another, either may be moved.

A method for forming the recess 2 in the work 1 will be described next with reference to FIG. 2. A plate made of aluminum, copper, or another metal that is capable of being cut and that has a thickness of 0.2 to several millimeters is immobilized in a set position on the moving apparatus, which is not shown. The cutting tool 10 is held by the moving apparatus in a state slanted at the prescribed angle θ.

As shown in FIG. 2(A), the worked surface 1a on one end of the work 1 is first formed by the cutting tool 10. The worked surface 1a results from moving the cutting tool 10 in the carving direction at the angle θ, cutting a plurality of times as shown by the two-dotted line until the end of the work 1 reaches the depth d of the recess 2. The blade part 10a of the cutting tool 10 is then brought into contact further upstream by a distance of a dimension 1, after which the cutting tool 10 is moved in the carving direction at the angle θ, and the cutting fin 3 begins to be vertically formed, as shown in FIG. 2(B). The thickness of the cutting fin 3 may be set freely according to the material and hardness of the work 1, the capabilities of the cutting tool 10 and the moving apparatus, the allowable range of stress to be applied to the work 1, or other factors, but the thickness of the proximal-end portion of the cutting fin 3 is set to approximately 0.05 mm to 2 mm.

As shown in FIG. 2(C), once the blade part 10a of the cutting tool 10 reaches the depth d of the aforedescribed recess 2, the movement of the cutting tool 10 in the carving direction is stopped, whereby the fin-forming step is ended. A transition is then made to the cutting step. As shown in FIG. 2(D), the cutting tool 10 is moved in the horizontal direction, which is parallel to the bottom surface of the recess 2 to be formed later. The cutting fin 3 formed in FIG. 2(C) is cut by this horizontal movement, becomes a scrap 4, and is separated from the work 1. An initial recess 2 having a width that is substantially equal to the proximal end of the cutting fin 3 is thereby formed on the end of the work 1.

The blade part 10a of the cutting tool 10 is then brought into contact further upstream by a distance of the dimension 1, after which the fin-forming step for moving the cutting tool 10 in the carving direction at the angle 0 and vertically forming the second cutting fin 3 is performed as shown in FIG. 2(E). A transition is then made to the cutting step. As shown in FIG. 2(F), the cutting tool 10 is moved in the horizontal direction, and the proximal end of the second cutting fin 3 is cut. The scrap 4 that is separated from the work 1 by the cutting of the cutting fin 3 is sandwiched between internal walls 2a of the recess 2 at this time, as described hereinafter, and is prevented from scattering. The recess 2 having a width equal to the proximal end of the cutting fin 3 is thus formed continuously with the initial recess 2 by the cutting of the cutting fin 3 on one end of the work 1.

Thereafter, the positioning step for bringing the blade part 10a of the cutting tool 10 into contact at a position further upstream by a distance of the dimension 1 (the cutting initiation position) is performed. The fin-forming step is then performed for moving the cutting tool 10 in the carving direction and vertically forming the next cutting fin 3. The cutting step is then performed for moving the cutting tool 10 in the horizontal direction, cutting the cutting fin 3, and thereby separating the scrap 4 from the work 1. These steps are repeatedly performed. The recess 2 having a width W that is equal to the width W of the blade part 10*a* of the cutting tool 10 is thereby formed as shown in FIG. 1. In a state in which the fin-forming step and the cutting step are repeatedly performed in sequence, a plurality of the scraps 4 are thus sandwiched in the recess 2 between the internal walls 2*a* of the recess 2, as shown in FIG. 1. The plurality of the scraps 4 are collected and removed by appropriate means. A flange part 1*b* having an initial thickness t is formed in on both sides of the recess 2 and on the other end of the work 1; i.e., in three locations. The worked surface 1*a* also remains on the other end of the work 1. This worked surface 1*a* is removed by appropriate means, and the internal corner thereof may be formed into a right angle similar to both sides of the recess 2.

Figure 3:
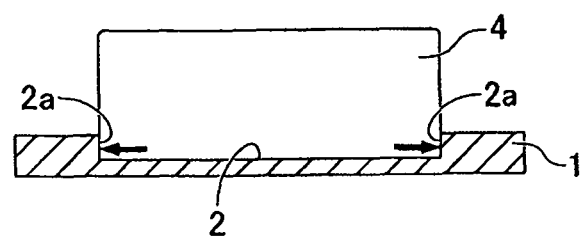
FIG. 3 is a descriptive diagram that shows a state in which a scrap is sandwiched between internal walls of the recess.
Figure 4:
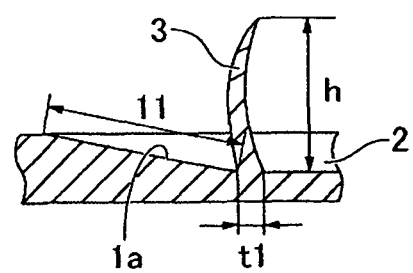
FIG. 4 is an enlarged cross-sectional view that shows a cutting fin.

FIG. 3 is a descriptive diagram that shows the scrap 4 sandwiched and thereby held between the internal walls 2*a* of the recess 2. When the cutting edge of the blade part 10*a* of the cutting tool 10 is formed to be slightly dull, and the cutting fin 3 is vertically formed in the fin-forming step, a thickness t1 of the proximal-end side of the cutting fin 3 will be thicker and will be formed to become thinner towards the end, as shown in FIG. 4. The height h of the cutting fin 3 therefore also becomes shorter than a length l1 of the worked surface 1*a*. This shortening also depends on the cutting resistance of the blade part 10*a*, and both sides of the cutting fin 3 protrude in the direction of the arrows shown in FIG. 3 at the same time as the thickness t1 on the proximal-end side of the cutting fin 3 becomes greater. As a result, the cutting fin 3 is sandwiched and held between the internal walls 2*a* of the recess 2. The scrap 4 is then maintained in a state of being sandwiched between the internal walls 2*a* of the recess 2, even when the proximal end of the cutting fin 3 is cut in the cutting step, and therefore scattering of the scrap 4 is prevented.

Figure 5:
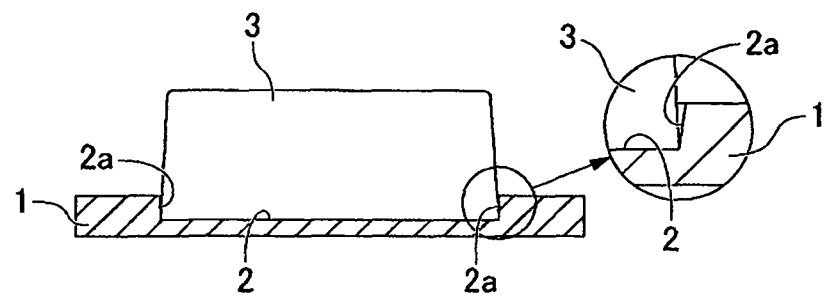
FIGS. 5(A) and (B) are cross-sectional views that show modified examples of the recess.
Figure 5:
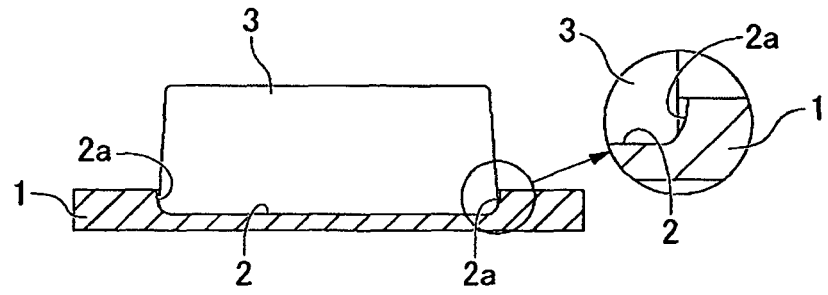

As shown in FIG. 3, when both sides of the bottom surface of the blade part 10*a* of the cutting tool 10 are formed at substantially right angles, the contacting area between the internal walls 2*a* of the recess 2 and both sides of the cutting fin 3 increases, and therefore removal of the scrap 4 may be difficult. In such instances, the aforedescribed blade part 10*a* of the cutting tool 10 can be changed, whereby the contacting area can be reduced, as shown in FIGS. 5(A) and (B). When the blade part 10*a* is formed so as to gradually increase in size from the bottom surface toward the upper surface and the cutting fin 3 is formed using this cutting tool 10, particularly the bottom-surface ends of both sides of the cutting fin 3 are sandwiched where the internal walls 2*a* of the recess 2 are narrow, and the wider aperture-sides are released or weakly sandwiched as shown in FIG. 5(A). Holding and removing the scrap 4 are therefore facilitated. When the blade part 10*a* is formed so that both of the bottom-surface ends have an arc shape and is used, the bottom-surface side of the recess 2 is narrow, and the aperture-side surface is wide and, therefore, particularly the bottom-surface sides of the internal walls 2*a* of the recess 2 sandwich the cutting fin 3, and the aperture sides are free or weakly sandwiched as shown in FIG. 5(B). Holding and removal of the scrap 4 are therefore facilitated in this example, as well.

According to the aforedescribed method of forming a recess in a work, the thickness of the cutting fin 3 in the fin-forming step is set to be thin at approximately 0.05 mm to 2 mm, and is vertically formed. The thin cutting fin 3 is then cut and separated by the horizontal motion of the cutting tool 10 in the cutting step, whereby the stress on the work 1 can be minimized. The width W of the cutting tool 10 is set appropriately, whereby even when the recess 2 has a large area, the recess can be readily formed. The recess 2 can be formed by simple operations for moving the cutting tool 10 in the carving direction and in the horizontal direction and, therefore, the configuration of the moving apparatus is simple. The cutting fin 3 is thin and, therefore, the moving apparatus may be small. The moving apparatus can therefore be inexpensively manufactured, and costs that include the depreciation of the moving apparatus can be reduced.

Embodiment 2

Figure 6:
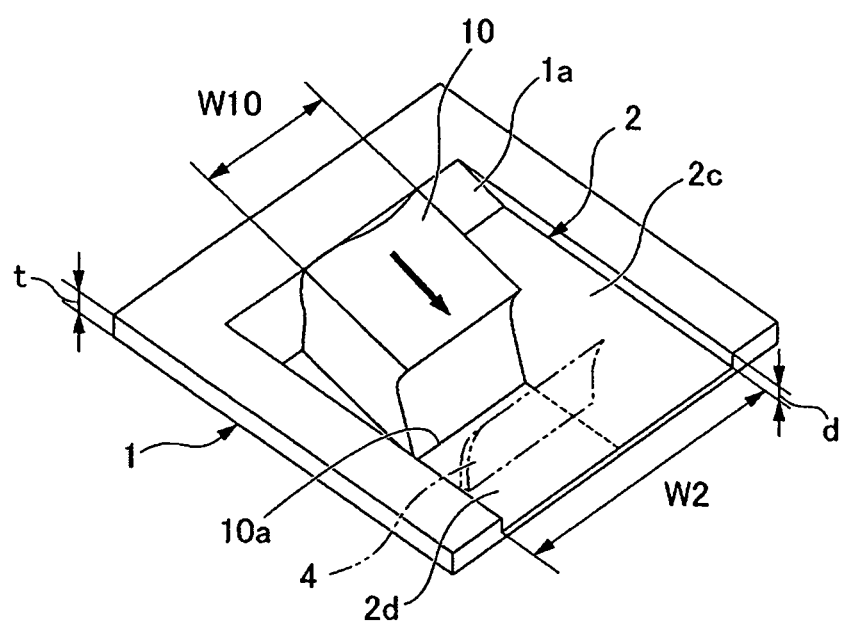
FIG. 6 is a perspective view that shows an example of forming the recess in a plurality of segments.

A method was described above in Embodiment 1 in which the recess 2 having the prescribed width W was formed using the cutting tool 10 set to have the same width W, but the steps for forming the recess are preferably repeated a plurality of times depending on the material and hardness of the work 1 and the capabilities of the moving apparatus, or when forming a wide recess. FIG. 6 shows an example application for such instances.

In FIG. 6, a width W10 of the cutting tool 10 is set to be smaller than a width W2 of the recess 2 of the work 1. The width W10 of the cutting tool 10 in this instance is preferably set narrow so as to be a fraction of the width W2 of the recess 2. The width in the example in FIG. 6 is set to be one half of the width of the recess 2. The width W10 of the cutting tool 10 may not necessarily need to be set as a fraction if a neighboring second recess 2*d* is to be formed overlapping an initially formed recess 2*c*.

As shown on the right side of FIG. 6, the narrow initial recess 2*c* is formed first using the cutting tool 10, which is set to be smaller than the width W2 of the recess 2. This method of forming a recess also involves repeatedly performing the fin-forming step and the cutting step, as in the method shown in FIGS. 2(A) through 2(F), and a description thereof will be omitted. The second recess 2*d* is formed adjoining the initial narrow recess 2*c* thus formed. The method for forming the second recess 2*d* also involves repeatedly performing the fin-forming step and the cutting step, as in the method shown in the aforedescribed FIGS. 2(A) through 2(F), and a description thereof will be omitted. A number of protrusions may be produced in cases where gaps occur to some extent between the initial narrow recess 2*c* and the neighboring second recess 2*d*. In order to avoid this occurrence, the width W10 of the cutting tool 10 is preferably set to be slightly larger than a fraction of the width W2 of the recess 2, and the adjoining recesses 2*c*, 2*d* are formed to be slightly overlapping.

Embodiment 3

Figure 7:
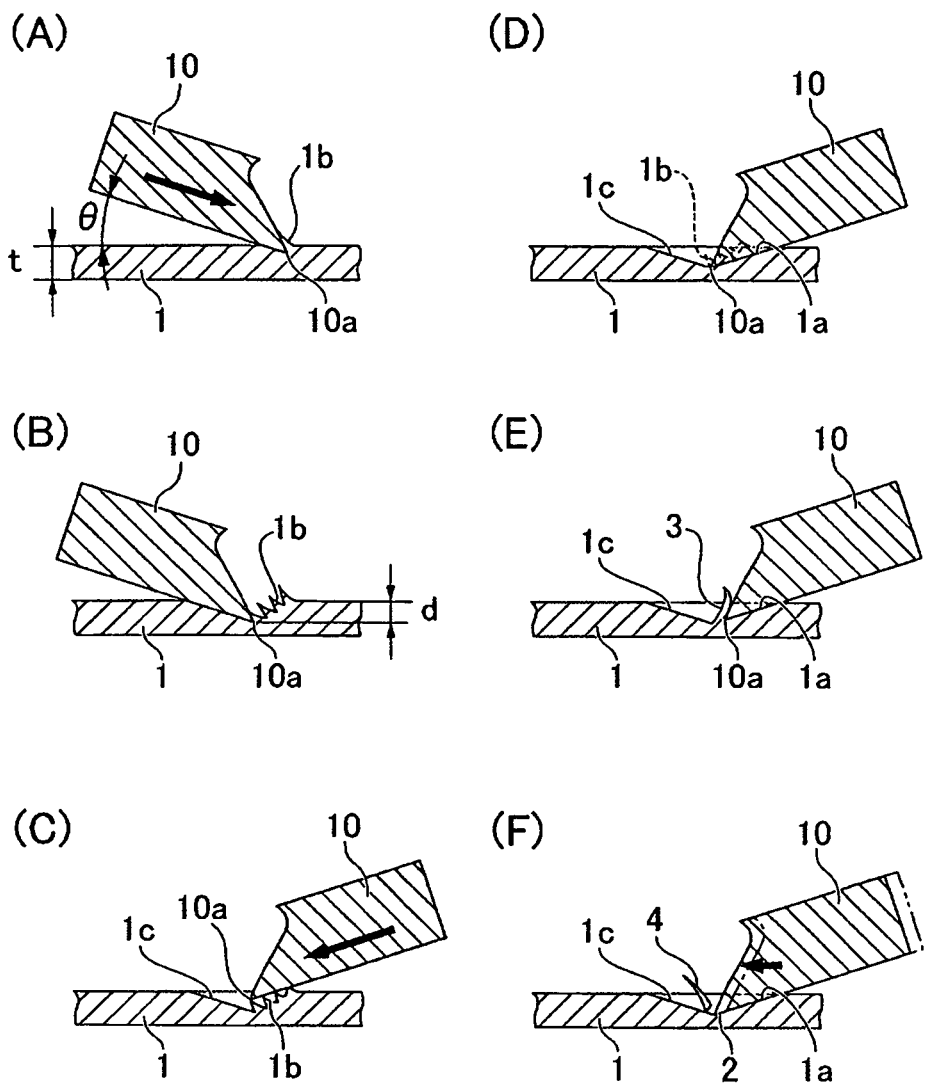
FIGS. 7(A) through (F) are step-describing diagrams that show the steps for forming a worked surface when forming the recess from a central location of the work.

FIGS. 7(A) through 7(F) show a method for forming in advance the worked surface 1*a* when forming the recess 2 from the planned location of the recess-forming surface located on the upper surface of the work 1. First, as shown in FIG. 7(A), the blade part 10*a* of the cutting tool 10 is moved in the carving direction at the angle θ and is inserted so as to cut into one end of the planned location of the work 1. A small fin 1*b* is thereby made to rise from the upper surface of the work 1. The cutting tool 10 is then moved in the carving direction from a position set apart from the fin 1*b*, and the next fin 1*b* is formed. The formation of the fin 1*b* is repeatedly performed thereafter. A plurality of the fins 1*b* are formed until eventually the blade part 10*a* of the cutting tool 10 reaches the depth d of the planned recess 2, as shown in FIG. 7(B). As a result, a worked surface 1*c* is formed on one side below the bottom surface of the cutting tool 10. The direction of movement of the cutting tool 10 or the orientation of the work 1 is then reversed, the blade part 10a of the cutting tool 10 is moved in the carving direction at the angle θ, and a plurality of the fins 1b are cut and thereby separated, whereby the worked surface 1a is formed.

The plurality of the fins 1b may be cut in one movement at this point, but gradually cutting in phases is preferable in order to minimize the stress on the work 1. In other words, the cutting tool 10 is first used to cut the plurality of the fins 1b from the ends at an appropriate location in the central portions thereof, as shown in FIG. 7(C). The proximal ends of the plurality of the fins 1b are then cut, and the worked surface 1a is formed as shown in FIG. 7(D). Then, in the fin-forming step, the blade part 10a of the cutting tool 10 is brought into contact upstream by a prescribed distance, after which the cutting tool 10 is moved in the carving direction at the angle θ, and the cutting fin 3 is vertically formed, as shown in FIG. 7(E). In the cutting step as shown in FIG. 7(F), the cutting tool 10 is then moved in the horizontal direction, and the cutting fin 3 is cut and thereby separated from the work 1, at which point the recess 2 having a width equal to the proximal end of the cutting fin 3 is formed in the work 1.

Figure 8:
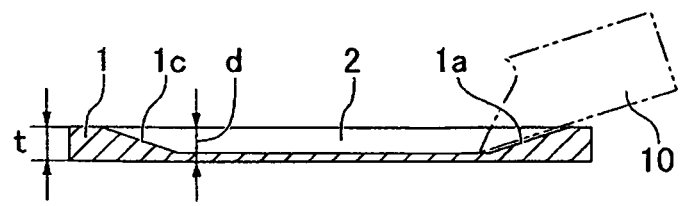
FIG. 8 is a cross-sectional view that shows a work in which the recess was formed by the method of forming a recess in a work according to the present invention.

Thereafter, the blade part 10a of the cutting tool 10 is brought into contact upstream by the prescribed distance. The fin-forming step is then performed for moving the cutting tool 10 in the carving direction and vertically forming the next cutting fin 3. The cutting step is then performed for moving the cutting tool 10 in the horizontal direction and cutting the cutting fin 3, which is thereby separated from the work 1. These steps are repeatedly performed, whereby the recess 2 having a prescribed width is formed in the central part on the upper surface of the work 1, as shown in FIG. 8. The worked surface 1c is formed on one side of the recess 2 of the work 1, and the worked surface 1a is formed on the other side.

Embodiment 4

A slanted worked surface was formed on at least one end of the recess 2 in the work 1 in the aforedescribed embodiments, but, depending on the application, forming a right angle between the bottom surface and the internal wall on both sides of the recess 2 is necessary. Forming the recess 2 after first forming a channel having a prescribed depth and width is preferable in such instances.

Figure 9:
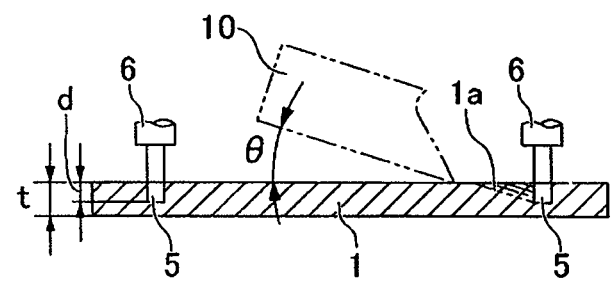
FIG. 9 is a cross-sectional view that shows a method for forming the corner part of the bottom part of the recess into a right angle.

In other words, a channel 5 having the prescribed depth d and the width W is formed in advance in at least one end of the planned location for forming the recess 2 in the work 1, as shown in FIG. 9. The channel 5 can be formed by, e.g., an end mill 6, a drill, or another appropriate working tool. Once the channel 5 is formed, the worked surface 1a is formed on one side of the work 1 in a state in which the blade part 10a of the cutting tool 10 faces the channel 5. The cutting tool 10 is moved in the carving direction at the angle θ, and cutting is performed a plurality of times, as shown by the dashed-two dotted lines, until the end of the work 1 reaches the depth d of the recess 2, whereby the worked surface 1a is formed. Thereafter, the blade part 10a of the cutting tool 10 is brought into contact upstream by the prescribed distance. The fin-forming step is then performed for moving the cutting tool 10 in the carving direction at the angle θ and vertically forming the next cutting fin 3. The cutting step is then performed for moving the cutting tool 10 in the horizontal direction and cutting the cutting fin 3, which is thereby separated from the work 1. These steps are repeatedly performed, whereby one side of the recess 2 is formed so that the corner part between the bottom surface and the internal wall is a right angle.

Figure 10:
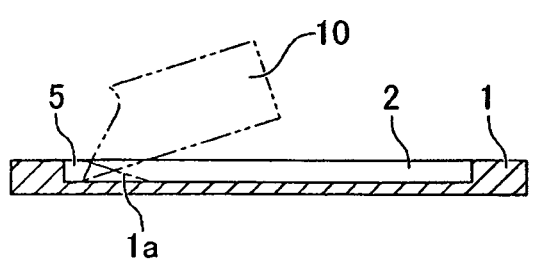
FIG. 10 is a cross-sectional view that shows a work in which the recess has been formed according to the method shown in FIG. 9.

In this state, the worked surface 1a remains on the other side of the recess 2, as shown by the dashed-two dotted line in FIG. 10. Accordingly, the orientation of the cutting tool 10 or the work 1 is reversed, and cutting is performed a plurality of times towards the channel 5 formed on the other end of the planned location for forming the recess 2 until reaching the depth d of the recess 2, whereby the worked surface is formed. The fin-forming step and the cutting step are then repeatedly performed in sequence until the bottom surface of the recess 2 becomes flat, as shown in FIG. 10. The recess 2 having a prescribed depth and area is thereby formed in the work 1, as shown in FIG. 10. The recess 2 of the work 1 is formed so that the corner parts between the bottom surface and the internal walls are right angles.

Embodiment 5

Figure 2:
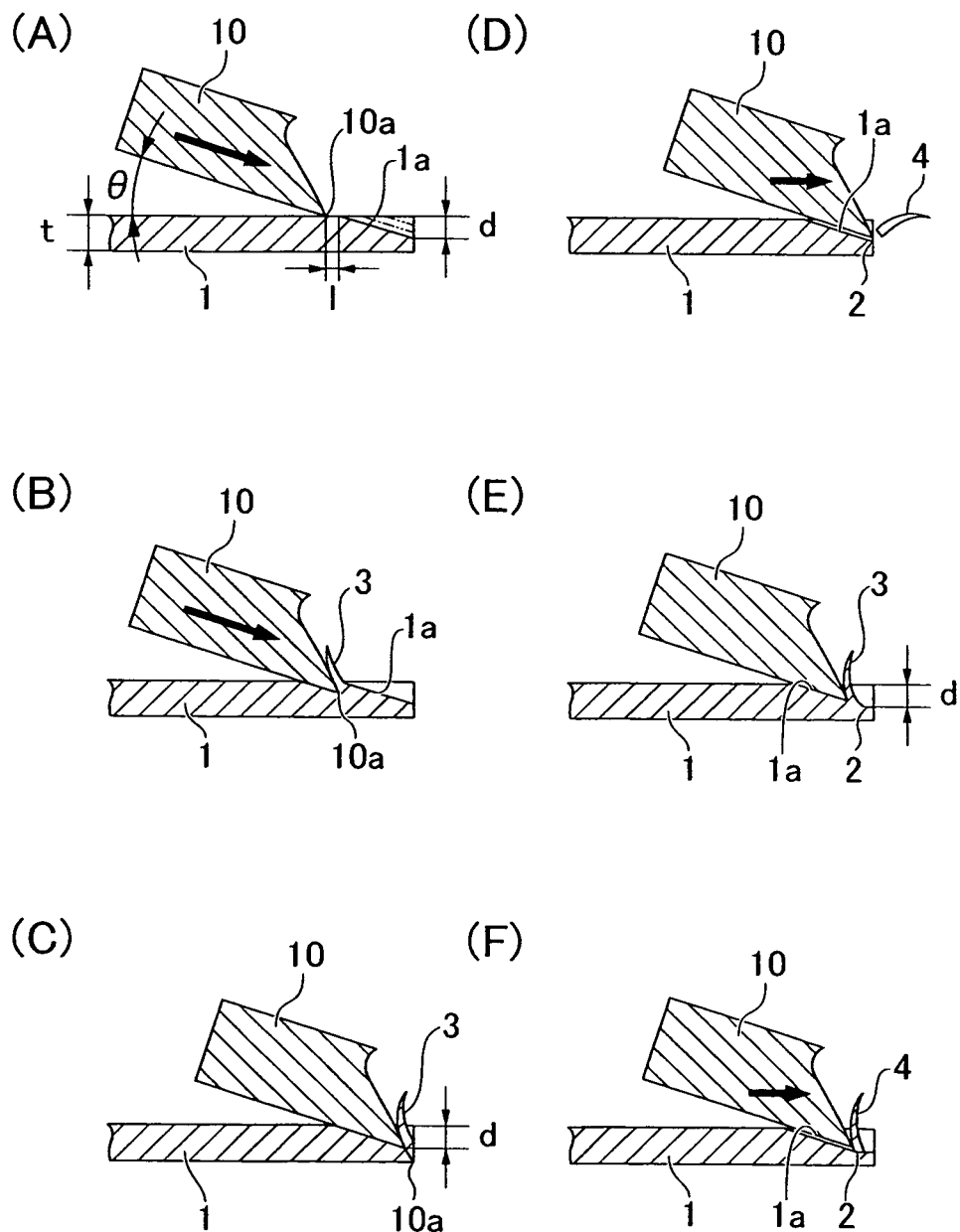
FIGS. 2(A) through (F) are step-describing diagrams that show the steps of the method of forming a recess.
Figure 11:
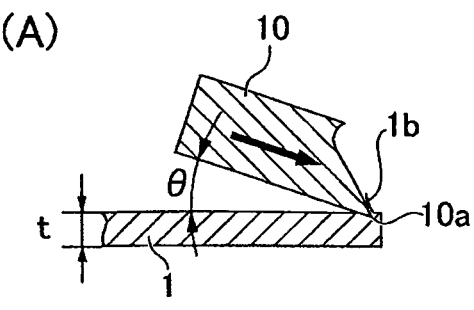
FIGS. 11(A) through (F) are step-describing diagrams that show means for preventing the scattering of scraps.
Figure 11:
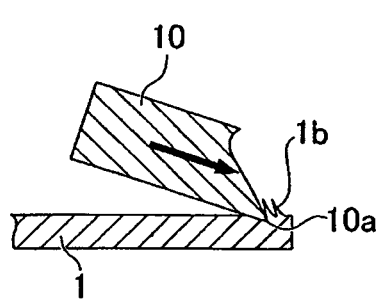
Figure 11:
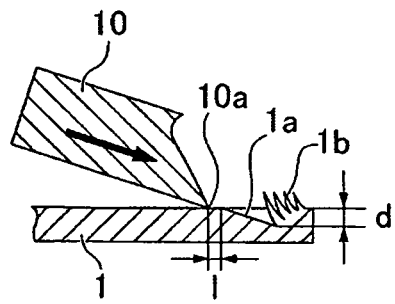
Figure 11:
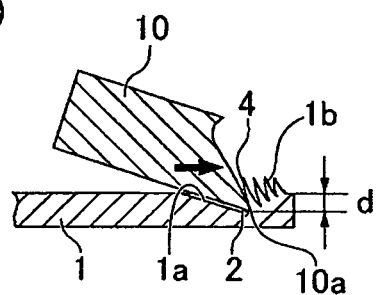
Figure 11:
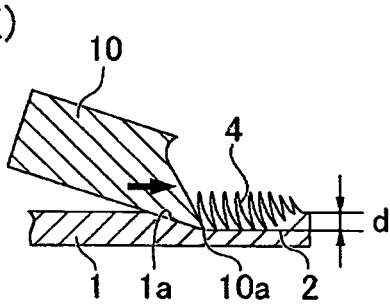
Figure 11:
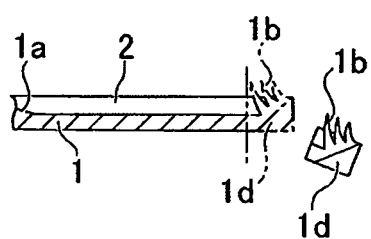

In the aforedescribed method of forming a recess shown in FIG. 2, first, as shown in FIG. 2(A), the cutting tool 10 is moved in the carving direction at the angle θ, and cutting is performed a plurality of times, as shown by the two-dotted line, until one end of the work 1 reaches the depth d of the recess 2, in order to form the worked surface 1a on one end of the work 1. Thin fin-shaped scraps are separated from the work 1 by this cutting, and the thin and light scraps will scatter and thereby adhere to the work or the blade part of the cutting tool, possibly resulting in breakage, damage, or the like. Since the load quickly disappears when the cutting tool 10 passes the end of the work 1, breakthrough phenomena may occur. The blade part 10a of the cutting tool 10 may therefore be damaged or degraded, and the life of the blade part may be drastically shortened. Forming the worked surface 1a using the means shown in FIG. 11 is ideal for avoiding such problems.

First, as shown in FIG. 11(A), the blade part 10a of the cutting tool 10 is moved in the carving direction at the angle θ and is inserted so as to cut into the vicinity of one end of the work 1. The small fin 1b is thereby made to rise from the upper surface of the work 1. The cutting tool 10 is then moved in the carving direction from a position set apart from the fin 1b, and the next fin 1b is formed, as shown in FIG. 11(B). The formation of the fin 1b is repeatedly performed thereafter. A plurality of the fins 1b are formed until the blade part 10a of the cutting tool 10 reaches the depth d of the planned recess 2, as shown in FIG. 11(C). As a result, the worked surface 1a is formed on the work 1. The plurality of the fins 1b are formed in a state in which the proximal ends thereof are linked to the work 1 in this instance.

Thereafter, as shown in FIG. 11(C), the blade part 10a of the cutting tool 10 is brought into contact further upstream by a distance of the dimension 1, after which the fin-forming step for moving the cutting tool 10 in the carving direction at the angle θ and vertically forming the cutting fin is performed as shown in FIG. 11(D). A transition is then made to the cutting step. The cutting tool 10 is moved in the horizontal direction, and the proximal end of the cutting fin is cut. The scrap 4 that is separated from the work 1 by the cutting of the cutting fin is thus sandwiched between the internal walls 2a of the recess 2, as described hereinafter, and is prevented from scattering. The recess 2 having a width equal to the proximal end of the cutting fin is thus formed continuously with the initial recess 2 by the cutting of the cutting fin 3 on one end of the work 1.

Thereafter, the blade part 10a of the cutting tool 10 is brought into contact upstream by a distance of the dimension 1. The fin-forming step is then performed for moving the cutting tool 10 in the carving direction and vertically forming the next cutting fin. The cutting step is then performed for moving the cutting tool 10 in the horizontal direction, cutting the cutting fin, and separating the scrap 4 from the work 1.

These steps are repeatedly performed, whereby the recess 2 is formed in the work 1. In a state in which the fin-forming step and the cutting step are repeatedly performed in sequence, a plurality of the scraps 4 are thus held in a state sandwiched in the recess 2 between the internal walls 2a of the recess 2, as shown in FIG. 11(E). The plurality of the scraps 4 are collected and removed by appropriate means in a following step.

In the state in which the plurality of the scraps 4 have been removed, the plurality of the fins 1b remain linked to the work 1 in the vicinity of the end of the work 1. A flange part having the initial thickness t is generally formed around the recess 2. This flange part is cut to a prescribed shape, and the complete product is formed. As shown in FIG. 11(F), in this instance cutting is performed from further towards the recess 2 than the plurality of the fins 1b remaining in the vicinity of the end of the work 1, whereby the plurality of the fins 1b are separated together with scraps 1d of the work 1. The plurality of the fins 1b can thereby be prevented from scattering. Breakage, damage, or other problems due to the scraps adhering to the work or the blade part of the cutting tool can be prevented in advance, and damage or degradation of the cutting tool 10 due to the aforedescribed breakthrough phenomena can be prevented in advance.

Specifics of the present invention were described above on the basis of examples, but the present invention is not limited to these examples, and it shall be apparent that a variety of changes are possible within a scope that does not depart from the main points thereof. The forming method of the present invention can also be applied even when, e.g., a synthetic resin or a metal having a relatively low viscosity is used as the material of the work, and the fins are segmented. Plate-shaped metal was used in the aforedescribed examples, but the forming method of the present invention is also applicable to pressed components, molded components, and other three-dimensionally configured works, or to works assembled from other components. The structure of the cutting tool may also be changed as appropriate; e.g., the end of the blade part may be divided into a plurality of parts, and the plurality of fins formed simultaneously, whereby a plurality of recesses are formed.

The invention claimed is:

1. A method of forming a recess having a prescribed depth and area in a work made of a cuttable metal material, the prescribed area having a length and a width, the method comprising the steps of:
    (1) providing a cutting tool having a blade part formed on an end thereof;
    (2) orienting the cutting tool at a prescribed angle relative to an upper surface of the work at a first location on the work upper surface;
    (3) forming a worked surface at the first location of the work upper surface by moving the cutting tool in a carving direction relative to the work a sufficient number of times to cut the work upper surface at the first location to the prescribed depth of the recess to be formed;
    (4) repositioning the cutting tool with respect to the work to a cutting location that is a prescribed distance upstream of the worked surface of the work;
    (5) moving the cutting tool in the carving direction into the upper surface of the work until the cutting tool reaches the prescribed depth of the recess to be formed to form a cutting fin;
    (6) moving the cutting tool in a horizontal direction along the direction of the length of the prescribed area and parallel relative to a bottom surface of the recess to be formed until the cutting fin is cut and separated from the work as scrap;
    (7) repositioning the cutting tool with respect to the work upper surface to a cutting location that is a prescribed distance upstream of the cutting location of the previous repositioning step;
    (8) moving the cutting tool in the carving direction into the upper surface of the work until the cutting tool reaches the prescribed depth of the recess to be formed to form another cutting fin;
    (9) moving the cutting tool in a horizontal direction along the direction of the length of the prescribed area and parallel to the bottom surface of the recess to be formed until the another cutting fin is cut and separated from the work as scrap; and
    (10) repeating steps (7)-(9) until the recess having the prescribed area and depth is formed in the work,
    wherein the cutting tool is formed to have a width equal to the width of the recess, and
    wherein in the fin-forming steps of moving the cutting tool in the carving direction into the upper surface of the work until the cutting tool reaches the prescribed depth of the recess to be formed to form a respective cutting fin, when the cutting tool is used to carve the work and form the cutting fins, the thickness of the cutting fins is formed to become thinner from the proximal ends, proximal to the upper surface of the work, to the tips thereof, and both sides of the proximal ends of the cutting fins are made to protrude in the direction of the width of the prescribed area and the scraps are held by being sandwiched between internal walls of the recess, and
    wherein the cutting tool is oriented at the prescribed angle relative to the upper surface of the workpiece throughout the recess forming process.

* * * * *